(12) United States Patent
Bastide et al.

(10) Patent No.: US 9,871,758 B2
(45) Date of Patent: Jan. 16, 2018

(54) USER RECOMMENDATIONS IN A SOCIAL MEDIA NETWORK

(71) Applicant: International Business Machines Corporation, Armonk, NY (US)

(72) Inventors: Paul R. Bastide, Boxford, MA (US); Lisa Seacat DeLuca, Baltimore, MD (US); Lydia M. Do, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 14/227,968

(22) Filed: Mar. 27, 2014

(65) Prior Publication Data

US 2015/0281163 A1    Oct. 1, 2015

(51) Int. Cl.
*H04L 12/58* (2006.01)
*G06Q 10/10* (2012.01)

(52) U.S. Cl.
CPC .......... *H04L 51/32* (2013.01); *G06Q 10/10* (2013.01)

(58) Field of Classification Search
CPC .............. G06F 17/30985; G06Q 50/01; G06Q 30/0269; H04L 51/32
See application file for complete search history.

(56) References Cited

U.S. PATENT DOCUMENTS

| | | | |
|---|---|---|---|
| 7,844,668 B2 | 11/2010 | Canning et al. | |
| 9,135,291 B2 * | 9/2015 | Assam | G06F 17/30386 |
| 2003/0139902 A1 | 7/2003 | Geib et al. | |
| 2009/0222551 A1 * | 9/2009 | Neely | G06Q 30/02 |
| | | | 709/224 |
| 2010/0082576 A1 | 4/2010 | Walker et al. | |
| 2010/0121849 A1 | 5/2010 | Goeldi | |
| 2011/0154223 A1 * | 6/2011 | Whitnah | H04L 51/32 |
| | | | 715/753 |

(Continued)

FOREIGN PATENT DOCUMENTS

WO    2013106708 A1    7/2013

OTHER PUBLICATIONS

Macindoe, O., et al. "Graph Comparison Using Fine Structure Analysis". IEEE International Conference on Social Computing / IEEE International Conference on Privacy, Security, Risk and Trust. pp. 193-200. Copyright 2010 IEEE.

(Continued)

*Primary Examiner* — Barbara B Anyan
(74) *Attorney, Agent, or Firm* — Daniel R. Simek (57) ABSTRACT

An approach for facilitating handling of a post to an online social network is provided. In the approach, a first post to an online social network is received. A processor identifies keywords associated with the first post. A processor identifies one or more posts similar to the first post based on at least the identified keywords, wherein the identified one or more posts were previously posted to the online social network. A processor determines one or more posts, of the identified one or more posts, that are within a predetermined threshold of similarity to the first post, based on at least a comparison between the identified one or more posts and the first post. A processor determines at least one recommendation of an action to perform in the online social network based at least on actions associated with the determined posts that are within the predetermined threshold of similarity.

17 Claims, 3 Drawing Sheets

(56) References Cited

U.S. PATENT DOCUMENTS

| | | | |
|---|---|---|---|
| 2011/0179020 A1* | 7/2011 | Ozzie | G06F 17/3089 |
| | | | 707/723 |
| 2012/0005224 A1* | 1/2012 | Ahrens | G06Q 10/10 |
| | | | 707/769 |
| 2012/0102114 A1 | 4/2012 | Dunn et al. | |
| 2012/0166290 A1 | 6/2012 | Reis et al. | |
| 2012/0323928 A1 | 12/2012 | Bhatia | |
| 2013/0018955 A1 | 1/2013 | Thaxton et al. | |
| 2013/0073935 A1 | 3/2013 | Bertot et al. | |
| 2013/0117261 A1* | 5/2013 | Sambrani | G06F 17/30867 |
| | | | 707/734 |
| 2013/0124437 A1 | 5/2013 | Pennacchiotti et al. | |
| 2014/0156996 A1* | 6/2014 | Heppe | G06Q 30/00 |
| | | | 713/175 |
| 2014/0163954 A1 | 6/2014 | Joshi et al. | |
| 2014/0289034 A1* | 9/2014 | Wu | G06Q 30/0231 |
| | | | 705/14.31 |
| 2014/0358904 A1* | 12/2014 | Nayak | G06F 17/30864 |
| | | | 707/723 |
| 2015/0089409 A1* | 3/2015 | Asseily | G06Q 10/10 |
| | | | 715/765 |
| 2015/0127591 A1 | 5/2015 | Gupta et al. | |

OTHER PUBLICATIONS

"Natural language processing—Wikipedia, the free encyclopedia". [online] [Retrieved on: Jan. 28, 2014]. <url:http://en.wikipedia.org/wiki/Natural_language_processing>.

"Social graph—Wikipedia, the free encyclopedia". [online] [Retrieved on: Jan. 28, 2014]. <url:htip://en.wikipedia.org/wiki/Social_graph>.

"IBM SPSS Statistics". [online] [Retrieved on: Jan. 28, 2014]. <http://www-01.ibm.com/software/analytics/spss/products/statistics>.

"IBM-SPSS Text Analytics for Surveys-United States". [online] [Retrieved on: Jan. 28, 2014]. <http://www-03.ibm.com/software/products/en/spss-text-analytics-surveys>.

* cited by examiner

USER RECOMMENDATIONS IN A SOCIAL MEDIA NETWORK

TECHNICAL FIELD

The present invention relates generally to the field of online social networks, and more particularly to messaging in an online social network.

BACKGROUND

A social media network is a mechanism that facilitates connection between people and information in an organized manner, which enables and facilitates the sharing of information between members of the social media network. Social media network services consist of a representation of each user (e.g., a profile), social links, and a variety of additional services. A large number of web-based social media networks exist (i.e., online social networks), which include services that allow users of the social media network to create a public profile, to create a list of users with whom to share connection, and to share and send messages throughout the network. A common mechanism for sharing information on online social networks is an activity stream. An activity stream includes a listing of recent activities that are associated with one or more individuals that are utilizing the online social network.

SUMMARY

In one aspect, the present invention provides a method for facilitating handling of a post to an online social network. The method includes receiving, by one or more processors, a first post to an online social network. The method further includes identifying, by one or more processors, keywords associated with the first post. The method further includes identifying, by one or more processors, one or more posts similar to the first post based on at least the identified keywords, wherein the identified one or more posts were previously posted to the online social network. The method further includes determining, by one or more processors, one or more posts, of the identified one or more posts, that are within a predetermined threshold of similarity to the first post, based on at least a comparison between the identified one or more posts and the first post. The method further includes determining, by one or more processors, at least one recommendation of an action to perform in the online social network based at least on actions associated with the determined posts that are within the predetermined threshold of similarity.

In another aspect, the present invention provides a computer program product for facilitating handling of a post to an online social network. The computer program product includes one or more computer readable storage media and program instructions stored on the one or more computer readable storage media. The program instructions include program instructions to receive a first post to an online social network. The program instructions further include program instructions to identify one or more posts similar to the first post based on at least the identified keywords, wherein the identified one or more posts were previously posted to the online social network. The program instructions further include program instructions to determine one or more posts, of the identified one or more posts, that are within a predetermined threshold of similarity to the first post, based on at least a comparison between the identified one or more posts and the first post. The program instructions further include program instructions to determine at least one recommendation of an action to perform in the online social network based at least on actions associated with the determined posts that are within the predetermined threshold of similarity.

In yet another aspect, the present invention provides a computer system for facilitating handling of a post to an online social network. The computer system includes one or more computer processors, one or more computer readable storage media, and program instructions stored on the computer readable storage media for execution by at least one of the one or more processors. The program instructions include program instructions to receive a first post to an online social network. The program instructions further include program instructions to identify one or more posts similar to the first post based on at least the identified keywords, wherein the identified one or more posts were previously posted to the online social network. The program instructions further include program instructions to determine one or more posts, of the identified one or more posts, that are within a predetermined threshold of similarity to the first post, based on at least a comparison between the identified one or more posts and the first post. The program instructions further include program instructions to determine at least one recommendation of an action to perform in the online social network based at least on actions associated with the determined posts that are within the predetermined threshold of similarity.

In yet another aspect, the present invention provides a method for deploying a system for facilitating handling of a post to an online social network, comprising: providing a computer infrastructure being operable to: receive a first post to an online social network; identify one or more posts similar to the first post based on at least the identified keywords, wherein the identified one or more posts were previously posted to the online social network; determine one or more posts, of the identified one or more posts, that are within a predetermined threshold of similarity to the first post, based on at least a comparison between the identified one or more posts and the first post; determine at least one recommendation of an action to perform in the online social network based at least on actions associated with the determined posts that are within the predetermined threshold of similarity.

DETAILED DESCRIPTION

Embodiments of the present invention allow for determining and providing recommendation of next actions for a message posted to an online social network. Some examples of determined next actions can include adding a collaborator, adding an embedded experience, redirecting a message, posting a message in a specific community or activity stream, refining a message, or other recommendations of actions that can lead to receiving a response to the original message (e.g., the received posted message). In one embodiment, a user posts a message on an online social network, and that message is analyzed to identify messages that are related. The message is compared to the identified related messages to identify one or more possible next actions that can be performed, which may lead to an improved response to the posted message. A set of possible next actions are determined and provided to the user that posted the message.

Some embodiments of the present invention recognize that activities and communication on online social networks are often coordinated among a plurality of users. In many instances, engaging the right user at the right time in an activity stream of an online social network can be a difficult task. The effectiveness of collaborations on online social networks can be diminished if certain actions are not taken, or messages are posted, but not seen by certain individuals.

Figure 1:
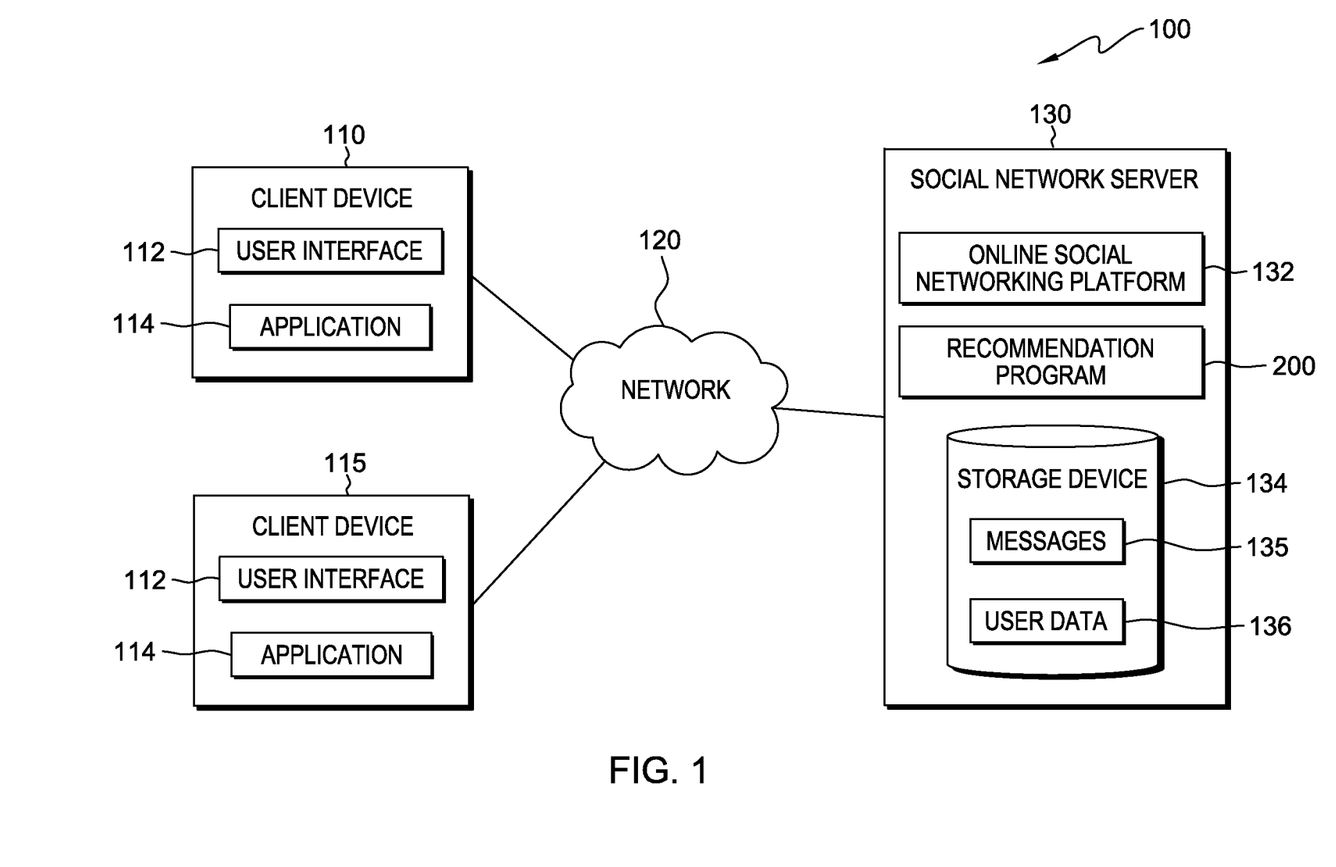
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An embodiment of data processing environment 100 includes client devices 110 and 115, and social network server 130, all interconnected over network 120. In an example embodiment, client devices 110 and 115 can communicate with social network server 130, via network 120, to access and participate on an online social network. For example, users of client devices 110 and 115 can view and post messages on an activity stream of an online social network that is hosted on social network server 130 (i.e., online social networking platform 132).

In various embodiments of the present invention, client devices 110 and 115 may be workstations, personal computers, personal digital assistants, mobile phones, or any other devices capable of executing program instructions in accordance with embodiments of the present invention. In general, client devices 110 and 115 are representative of any electronic device or combination of electronic devices capable of executing machine-readable program instructions, as described in greater detail with regard to FIG. 3, in accordance with embodiments of the present invention. Client devices 110 and 115 each include respective instances of user interface 112 and application 114. User interface 112 accepts input from individuals utilizing client devices 110 and 115. In example embodiments, an individual (through input via user interface 112) utilizing client device 110 or 115 can utilize application 114 to communicate with social network server 130, via network 120. In an example, application 114 can be a web browser that an individual utilizing client device 110 can use to access and utilize online social networking platform 132, which is hosted on social network server 130. In another embodiment, online social networking platform 132 on social network server 130 can be accessed and utilized by services or third-party applications, in accordance with various embodiments of the present invention.

In one embodiment, client devices 110 and 115, and social network server 130 communicate through network 120. Network 120 can be, for example, a local area network (LAN), a telecommunications network, a wide area network (WAN) such as the Internet, or a combination of the three, and include wired, wireless, or fiber optic connections. In general, network 120 can be any combination of connections and protocols that will support communications between client devices 110 and 115, and social network server 130 in accordance with embodiments of the present invention.

In example embodiments, social network server 130 can be a desktop computer, computer server, or any other computer system known in the art. In certain embodiments, social network server 130 represents computer systems utilizing clustered computers and components (e.g., database server computers, application server computers, etc.) that act as a single pool of seamless resources when accessed by elements of data processing environment 100 (e.g., client devices 110 and 115). In general, social network server 130 is representative of any electronic device or combination of electronic devices capable of executing machine-readable program instructions, as described in greater detail with regard to FIG. 3, in accordance with embodiments of the present invention.

Social network server 130 includes online social networking platform 132, storage device 134, and recommendation program 200. In various embodiments, social network server 130 hosts online social networking platform 132, which is representative of a web-based social media network. Online social networking platform 132 can be any form of web-based social media network (e.g., a network, a forum, a website, a community, etc.) including associated components and applications (e.g., activity streams, posting and sharing messages, instant messaging communication, etc.) that supports and facilitates communication and collaboration between users. For example, an individual utilizing client device 110 can access online social networking platform 132, via application 114, to post a message to an activity stream associated with an individual utilizing client device 115 (e.g., an activity stream associated with a user profile of the individual utilizing client device 115, an activity stream of a group associated with the individual utilizing client device 115, etc.). Additionally, the individual utilizing client device 115 can access online social networking platform 132, via application 114 to view, and respond to, the message posted by the individual utilizing client device 110. In other embodiments, online social networking platform 132 can be a mobile device-based social media network that is accessed and utilized by client devices 110 and 115 (e.g., mobile devices).

Storage device 134 includes messages 135 and user data 136. Storage device 134 can be implemented with any type of storage device, for example, persistent storage 308, which is capable of storing data that may be accessed and utilized by client devices 110 and 115, and social network server 130, such as a database server, a hard disk drive, or flash memory. In other embodiments, storage device 134 can represent multiple storage devices within social network server 130. In example embodiments, recommendation program 200 determines and provides recommendation of next actions for a message posted to online social networking platform 132, in accordance with embodiments of the present invention.

Messages 135 are messages, and other posts that have been previously posted on online social networking platform 132 (e.g., on an activity stream). In an example embodiment, when a message is posted to online social networking platform 132, the message is saved in storage device 134 as an instance of messages 135. Each instance of messages 135 includes corresponding metadata that indicates information that is associated with the message. For example, metadata can provide an indication of keywords included in the message (e.g., message topic), content of the message (e.g., Uniform Resource Locators (URLs) in the message), individuals associated with the message (e.g., message sender, message recipients, individuals mentioned in the message, etc.), and other types of information that utilizes metadata tags. In various embodiments, messages 135 that are posted on online social networking platform 132 can be any form of data that is posted by users of online social networking platform 132, as well as third-party application that access and utilize online social networking platform 132.

In another embodiment, messages 135 can include embedded experiences, which users of online social networking platform 132 can access and utilize. An embedded experience provides a user content while utilizing online social networking platform 132 (e.g., in an activity stream). In an example embodiment of an embedded experience, a URL link to a third-party website is posted to an activity stream in online social networking platform 132 for an individual utilizing client device 110. If the individual utilizing client device 110 selects the URL link, then the website corresponding to the URL link is embedded into the activity stream, instead of redirecting the individual utilizing client device 110 to the webpage in an external browser. In other embodiments, an embedded experience can occur responsive to accessing other forms of content that can be posted onto online social networking platform 132. In an example embodiment, messages that are posted to an activity stream may include a unique identifier and a preferred experience (e.g., an embedded experience) of a third-party application. When the message is activated (e.g., by an individual utilizing client device 110 or 115), the embedded experience of the message launches the corresponding third-party application, inline to the message and corresponding activity stream, with the preferred experience based on the unique identifier.

User data 136 is data that corresponds to users of online social networking platform 132 (e.g., users of client device 110 and 115, and other devices that may access online social networking platform 132). In various embodiments, user data 136 can include profile information corresponding to the user, a physical location of the user, groups of users that the user is associated with (e.g., groups and teams of users), topics associated with the user, messages that are associated with the user (e.g., messages sent, messages received, messages the user is mentioned in, etc.). For example, an individual utilizing client device 110 uses online social networking platform 132 to collaborate with a group of individuals on a project. User data 136 that is associated with the individual utilizing client device 110 includes data that indicates the group of individuals collaborating on the project (e.g., a group on online social networking platform 132), messages that the individual has posted on online social networking platform 132 (e.g., messages posted on an activity stream, instant messaging communications, etc.), responses to messages that were directed to the individual (e.g., replies, interactions with messages, sharing messages, etc.), as well as other activity on online social networking platform 132.

Figure 2:
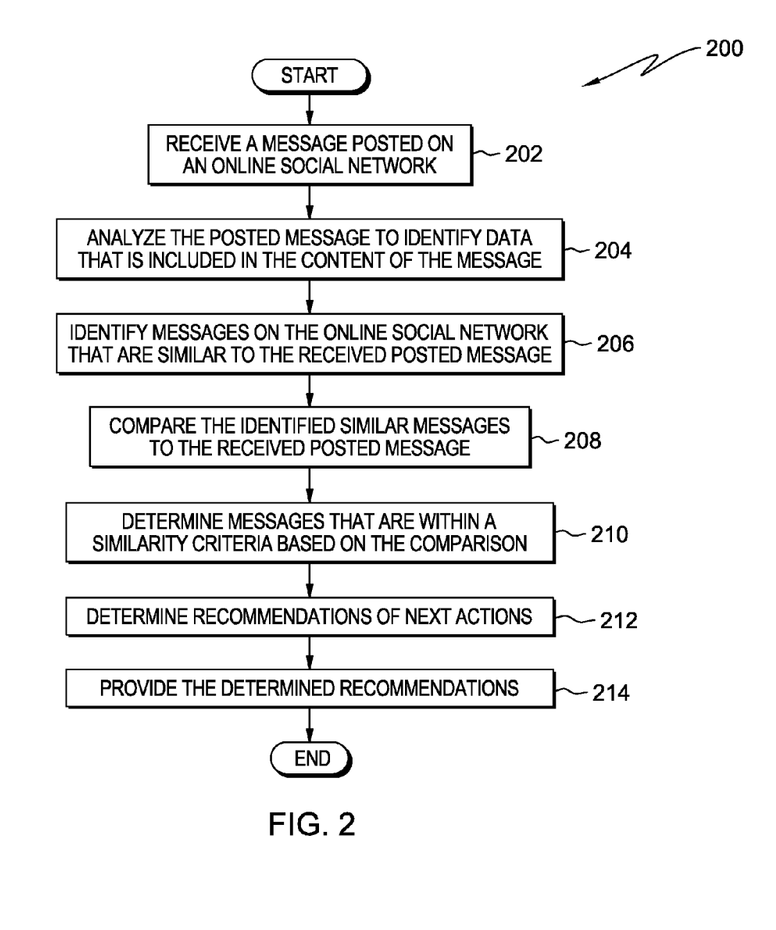
FIG. 2 is a flowchart depicting operational steps of a program for determining and providing recommendation of next actions for a message posted to an online social network, in accordance with an embodiment of the present invention.

FIG. 2 is a flowchart depicting operational steps of recommendation program 200 in accordance with an embodiment of the present invention. In one embodiment, recommendation program 200 operates on social network server 130 to monitor messages and other posts that can be posted to online social networking platform 132. Additionally, recommendation program 200 operates to facilitate handling of a post to online social networking platform 132 (e.g., facilitate how social media network server 130 handles a message that is posted on online social networking platform 132).

In step 202, recommendation program 200 receives a message posted on an online social network. In an example embodiment, recommendation program 200 receives a message posted to an activity stream of online social networking platform 132 from an individual utilizing client device 110. In various embodiments, the received message can be any form of post to an online social networking platform.

In step 204, recommendation program 200 analyzes the posted message to identify data that is included in the content of the message. More specifically, recommendation program 200 analyzes the message posted to online social networking platform 132 (from step 202) to identify a data set that corresponds to information associated with the message. Recommendation program 200 analyzes the posted message to identify keywords and phrases in the content of the message (e.g., message topic, message content, individuals associated with the message, metadata tags, etc.). In various embodiments, recommendation program 200 utilizes text analytics (e.g., Natural Language Processing (NLP), n-grams, and other natural language models) to identify a data set of keywords that corresponds to the content of the posted message. In one embodiment, recommendation program 200 analyzes metadata that is associated with the posted message to identify and extract keywords from the posted message (e.g., utilizing NLP text analytics). Additionally, recommendation program 200 analyzes metadata that is associated with the posted message to extract fields from the message that describe an action that is associated with the message.

In one embodiment, recommendation program 200 uses text analytics to parse through all available messages 135 and the received posted message on online social networking platform 132 based on keywords or common themes within the messages or associated data in online social networking platform 132. Using NLP and at least one set of dictionaries and rules, recommendation program 200 can perform text analytics on messages associated with online social networking platform 132 to create keywords or other metadata. Recommendation program 200 can perform text analytics using an Unstructured Information Management Architecture (UIMA) application configured to analyze unstructured information to discover patterns relevant to recommendation program 200 by processing plain text and identifying entities or relations.

In step 206, recommendation program 200 identifies messages on the online social network that are similar to the received posted message. More specifically, recommendation program 200 utilizes identified data and keywords of the posted message (from step 204) to identify one or more messages that have been previously posted on online social networking platform 132 (i.e., one or more instances of messages 134) that are similar to the received posted message. In another embodiment, an identified message can be a plurality of messages that are associated with a conversation on online social networking platform 132 (e.g., all or a subset of messages associated with a conversation on online social networking platform 132) and a sequence of messages posted to online social networking platform 132.

Recommendation program 200 can utilize varying scopes (e.g., messages corresponding to a user or group of users, an activity stream, a thread, a community, an online social network, etc.) of messages 135 to identify messages that are similar to the received posted message. For example, if the received posted message is posted on a community of online social networking platform 132 that corresponds to "Project A," then recommendation program 200 can identify messages that are similar the received posted message within the scope of messages 135 that were posted on the "Project A" community. In various embodiments, the scope of analysis by recommendation program 200 can be defined through user definition of preferences, based on keywords of the received posted message, based on the number of messages identified, or other metrics.

Recommendation program 200 analyzes metadata associated with messages 135, or a subset of messages 135, to identify messages that are similar to the identified posted message based on the identified data of the posted message (i.e., the identified data from step 204). In one example embodiment, recommendation program 200 identifies messages as similar if the messages share one or more particular common metadata and keywords. For example, recommendation program 200 identifies message H, of messages 135, to be similar to message D (which was received as a posted message in step 202) because message H and message D are both posted in the "Project A" community of online social networking platform 132 and include an association to collaborators R and J. In another example embodiment, recommendation program 200 identifies messages as similar if the messages have a certain minimum threshold (e.g., a minimum percentage, or a minimum number, etc.) of metadata and keywords in common. For example, message H, of messages 135, has associated metadata indicating keywords of {Project A, collaborators R and J, Topic B, URL link C, and metadata tag K}, and message D has associated metadata (identified in step 204) indicating keywords of {Project A, collaborators R and J, Topic B, and metadata tag G}. In this example, since message H and message D share three common metadata and keywords (i.e., over a threshold), recommendation program 200 identifies message H and message D to be similar. In another embodiment, if recommendation program 200 does not identify a certain number of similar messages, then recommendation program 200 can utilize an increased scope of messages 135 (e.g., increasing from messages associated with a specific user to messages associated with a certain community of users).

In step 208, recommendation program 200 compares the identified similar messages to the received posted message. More specifically, recommendation program 200 compares each of the one or more identified similar messages (from step 206) to the received posted message (from step 202). In one embodiment, recommendation program 200 determines, for each identified similar message based on associated metadata and keywords, a data structure for the identified posted message that compares each identified similar message to a data structure for the received posted message. For example, recommendation program 200 determines a graphical data structure that compares an identified similar message to the received posted message based on metadata and keywords that are associated with the messages. In another embodiment, recommendation program 200 can determine a lookup table to compare the identified received messages to the received posted message. An example lookup table can include listings and relationships of metadata and keywords that are associated with the identified similar messages in comparison to the received posted message. In various embodiments, the determined data structures can be simple lookup tables, key and value pairs in a table or heap, or other forms of data structures that are utilized for machine learning applications.

Additionally, the data structure can compare an identified message to the received posted message utilizing associating rules. Examples of associating rules can include one or more of: messages that contain a common collaborator, messages posted onto a common activity stream of online social networking platform 132, messages including a certain type of content, messages corresponding to a common project or activity, messages with similar response structures, and other associations that can be indicated in metadata and keywords of messages 135 and based on relationships between data structures. In an example embodiment of a data structure comparison utilizing associating rules, recommendation program 200 generates data structures for each of the identified similar messages (from step 206) that share a common associating rule of "posted on to activity stream N." Then recommendation program 200 compares the generated data structures to a generated data structure of the received posted message. In other embodiments, recommendation program 200 can generate data structures of varying scopes. For example, recommendation program 200 can generate data structure that include varying amounts of data (e.g., a high level data structure, a subset of the data, data within a certain range, etc.).

In step 210, recommendation program 200 determines messages that are within a similarity criteria based on the comparison. In one embodiment, recommendation program 200 utilizes a similarity criteria that provides a predetermined threshold of similarity for the comparison of the identified similar messages to the received posted message. In an example embodiment, the similarity criteria can be a minimum probability that language structure, or structures of the conversation (e.g., indicated in a corresponding data structure) are similar, and recommendation program 200 determines which messages, of the identified similar messages (of step 206), exceed the minimum probability. In another example embodiment, recommendation program 200 can determine and utilize a similarity matrix utilizing data structures and lookup tables corresponding to messages. In various embodiments, recommendation program 200 utilizes NLP algorithms and machine learning to determine a degree of similarity between the identified similar messages to the received posted message. In another embodiment, a determined message can be a plurality of messages that are associated with a conversation on online social networking platform 132 (e.g., all, or a subset of messages associated with a conversation on online social networking platform 132) and a sequence of messages posted to online social networking platform 132.

In step 212, recommendation program 200 determines recommendation of next actions. More specifically, recommendation program 200 determines recommendations of actions, as a potential next action that the user that posted the received posted message is capable of performing on online social networking platform 132, based on the determined messages that are within a similarity criteria. In one embodiment, recommendation program 200 accesses metadata corresponding to the determined messages that are within the similarity criteria to determine whether the messages have an associated subsequent action or message (of messages 135) that has been performed on online social networking platform 132. Recommendation program 200 can determine recommendations based on differences between the determined messages that are within the similarity criteria and the received posted message. For example, if recommendation program 200 determines that a message of the determined messages that are within the similarity criteria is directed to collaborator T and that message received a response, and the received posted message is directed to collaborator E, then recommendation program 200 determines a recommendation to direct the received posted message to collaborator T. In various embodiments, recommendation program 200 can determine recommendations that include adding a collaborator, adding an embedded experience, redirecting a message, posting a message in a specific community or activity stream, refining a message, or other recommendations of actions that can lead to receiving a response to the original message (e.g., the received posted message).

In step 214, recommendation program 200 provides the determined messages. More specifically, recommendation program 200 provides the determined recommendations (from step 212) to the user of online social networking platform 132 that posted the received posted message (from step 202). In an embodiment, recommendation program 200 provides the determined recommendation to an individual utilizing client device 110, via application 114. Recommendation program 200 allows the individual utilizing client device 110 to select one or more of the provided recommendation. In response to receiving a selection of one or more of the provided recommendations, recommendation program 200 performs an action associated with the received selection. In other embodiments, recommendation program 200 includes capabilities to receive feedback (e.g., from individuals utilizing client device 110 and 115), which can be utilized to optimize recommendation program 200.

In an example, an individual utilizing client device 110 posts a message to a community for "Project B" on online social networking platform 132 (step 202). Recommendation program 200 analyzes the posted message to identify a data set of associated metadata corresponding to the message that includes keywords of {Topic X, Message Content Y, and Metadata Tags J and P} (in step 204). Then recommendation program 200, utilizing the identified data set (of step 204), identifies a set of messages (i.e., instances of messages 135) that have been previously posted on online social networking platform 132 that are similar to the posted message (step 206). The identified set of messages includes a message, an instance of messages 135, that was previously posted on online social networking platform 132 and directed to an individual utilizing client device 115. In another example embodiment, recommendation program 200 utilizing the identified data set, identifies a set of messages that includes a message that was previously posted to an activity stream of online social networking platform 132 by a third-party application.

Recommendation program 200 determines a data structure (e.g., a graphical data structure) for each identified similar message of the set of identified similar messages, based on associated metadata and keywords, that compares each identified similar message to a data structure for the received posted message (step 208). Then recommendation program 200, based on the determined data structure comparisons, determines which messages in the identified set of similar messages are within a similarity criteria of a minimum probability that messages are similar (step 210). Recommendation program 200 determines that the message that was previously posted on online social networking platform 132 and directed to an individual utilizing client device 115 is within the similarity criteria. In other examples recommendation program 200 can identify additional messages in the identified set of similar messages are within the similarity criteria.

Then recommendation program 200 accesses metadata corresponding to the message that was directed to the individual utilizing client device 115 and determines that the message has an associated subsequent action or message that has been performed on online social networking platform 132. Recommendation program 200 determines one or more recommendations based on differences between the message and the posted message (step 212). In this example, since the individual utilizing client device 115 responded to the previously posted message that was directed at that individual, one of the one or more recommendations that recommendation program 200 determines is to direct the posted message in the community for "Project B" on online social networking platform 132 (from step 202) to the individual utilizing client device 115 (e.g., direct the posted message to a user profile associated with the individual utilizing client device 115). Then, recommendation program 200 provides the determined recommendations to the individual utilizing client device 110 (i.e., the individual that posted the message from step 202).

Recommendation program 200 allows the individual utilizing client device 110 to select and perform one or more of the determined and provided recommendations. Additionally, recommendation program 200 allows the individuals utilizing client device 110 and 115 to provide feedback to recommendation program 200, which recommendation program 200 records (e.g., in storage device 134) and can utilize to optimize the process of determining and providing recommendations.

In another embodiment, the invention provides a method that performs the process of the invention on a subscription, advertising, and/or fee basis. That is, a service provider, such as a Solution Integrator, could offer to provide handling of posts to an online social networking platform functionality. In this case, the service provider can create, maintain, support, etc., a computer infrastructure, such as data processing environment 100 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for handling of posts to an online social networking platform. In this case, a computer infrastructure, such as data processing environment 100 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as data processing environment 100 (FIG. 1), from a computer readable medium; (2) adding one or more computing devices to the computer infrastructure; and (3) incorporating and/or modifying one or more existing systems of the computer infrastructure to enable the computer infrastructure to perform the processes of the invention.

Figure 3:
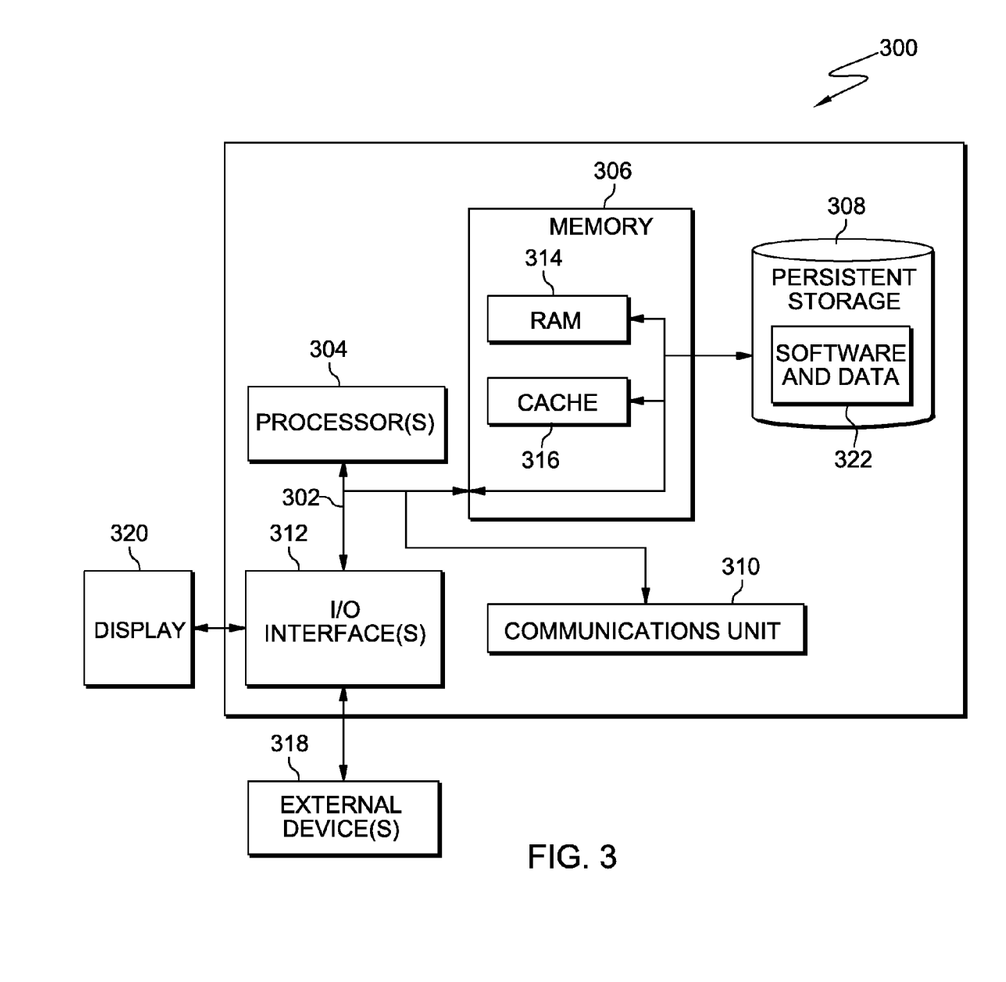
FIG. 3 depicts a block diagram of components of the computing system of FIG. 1 in accordance with an embodiment of the present invention.

FIG. 3 depicts a block diagram of components of computer 300, which is representative of client devices 110 and 115, and social network server 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computer 300 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are examples of computer readable tangible storage devices. A storage device is any piece of hardware that is capable of storing information, such as, data, program code in functional form, and/or other suitable information on a temporary basis and/or permanent basis. In this embodiment, memory 306 includes random access memory (RAM) 314 and cache memory 316. In general, memory 306 can include any suitable volatile or non-volatile computer readable storage device. Software and data 322 are stored in persistent storage 308 for access and/or execution by processors 304 via one or more memories of memory 306. With respect to client devices 110 and 115, software and data 322 represents application 114. With respect to social network server 130, software and data 322 represents online social networking platform 132, messages 135, user data 136, and recommendation program 200.

In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 may include one or more network interface cards. Communications unit 310 may provide communications through the use of either or both physical and wireless communications links. Software and data 322 may be downloaded to persistent storage 308 through communications unit 310.

I/O interface(s) 312 allows for input and output of data with other devices that may be connected to computer 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data 322 can be stored on such portable computer readable storage media and can be loaded onto persistent storage 308 via I/O interface(s) 312. I/O interface(s) 312 also can connect to a display 320.

Display 320 provides a mechanism to display data to a user and may be, for example, a computer monitor. Display 320 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for facilitating handling of a post to an online social network, the method comprising:
   receiving, by one or more processors, a first post to an online social network from a first user;
   identifying, by one or more processors, keywords associated with the first post;
   identifying, by one or more processors, one or more posts similar to the first post based on at least the identified keywords, wherein the identified one or more posts were previously posted to the online social network, wherein identifying one or more posts similar to the first post based on the identified keywords further comprises: utilizing, by one or more processors, Natural Language Processing (NLP) to analyze content, and associated metadata of posts that have been previously posted to the online social network;
   determining, by one or more processors, one or more posts, of the identified one or more posts, that are: (i) within a predetermined threshold of similarity to the first post, based on at least a comparison between the identified one or more posts and the first post, and (ii) are associated with a response received in the online social network; and
   determining, by one or more processors, at least one recommendation of an action to perform in the online social network based at least on actions associated with the determined posts that are within the predetermined threshold of similarity and are associated with the determined posts that have received a received response in the online social network, wherein the recommended action is a next action for the first user to perform, subsequent to posting the first post, in the online social network to solicit a response to the first post.

2. The method of claim 1, further comprising:
   providing, by one or more processors, the determined at least one recommendation of an action to the first user; and
   responsive to receiving a selection of at least one of the determined at least one recommendation, performing, by one or more processors, at least one action associated with the received selection.

3. The method of claim 1, wherein a post on the online social network comprises at least one of: a plurality of posts associated with a conversation on the online social network, a plurality of posts associated with a subset of a conversation on the online social network, a sequence of posts on the online social network, a message posted to the online social network by a user of the online social network, a message posted to the online social network by a third-party application, and an experience that is embedded into the online social network by a third-party application.

4. The method of claim 1, wherein identifying keywords associated with the first post, further comprises:
   utilizing, by one or more processors, Natural Language Processing (NLP) to analyze content, and associated metadata of the first post,
   wherein the identified keywords comprise at least one of: content of the post, users associated with the post, metadata tags, topics associated with the post, and groups in the online social network associated with the post.

5. The method of claim 1, wherein the determining one or more posts, of the identified one or more posts, that are within a predetermined threshold of similarity to the first post, based on a comparison between the identified one or more posts and the first post, further comprises:
   determining, by one or more processors, data structures for the identified one or more posts that compares an identified post to a data structure for the first post, based on identified keywords and metadata.

6. The method of claim 1, wherein the at least one recommendation of an action to perform in the online social network is based on differences between the determined one or more posts and the first post.

7. A computer program product for facilitating handling of a post to an online social network, the computer program product comprising:
one or more computer readable storage media and program instructions stored on the one or more computer readable storage media, the program instructions comprising:
program instructions to receive a first post to an online social network from a first user;
program instructions to identify keywords associated with the first post;
program instructions to identify one or more posts similar to the first post based on at least the identified keywords, wherein the identified one or more posts were previously posted to the online social network, wherein the program instructions to identify one or more posts similar to the first post based on the identified keywords further comprise program instructions to utilizing, by one or more processors, Natural Language Processing (NLP) to analyze content, and associated metadata of posts that have been previously posted to the online social network;
program instructions to determine one or more posts, of the identified one or more posts, that are: (i) within a predetermined threshold of similarity to the first post, based on at least a comparison between the identified one or more posts and the first post, and (ii) are associated with a response received in the online social network; and
program instructions to determine at least one recommendation of an action to perform in the online social network based at least on actions associated with the determined posts that are within the predetermined threshold of similarity and are associated with the determined posts that have received a received response in the online social network, wherein the recommended action is a next action for the first user to perform, subsequent to posting the first post, in the online social network to solicit a response to the first post.

8. The computer program product of claim 7, further comprising program instructions to:
provide the determined at least one recommendation of an action to the first user; and
responsive to receiving a selection of at least one of the determined at least one recommendation, perform at least one action associated with the received selection.

9. The computer program product of claim 7, wherein a post on the online social network comprises at least one of: a plurality of posts associated with a conversation on the online social network, a plurality of posts associated with a subset of a conversation on the online social network, a sequence of posts on the online social network, a message posted to the online social network by a user of the online social network, a message posted to the online social network by a third-party application, and an experience that is embedded into the online social network by a third-party application.

10. The computer program product of claim 7, wherein program instructions to identify keywords associated with the first post, further comprise program instructions to:
utilize Natural Language Processing (NLP) to analyze content, and associated metadata of the first post, wherein the identified keywords comprise at least one of: content of the post, users associated with the post, metadata tags, topics associated with the post, and groups in the online social network associated with the post.

11. The computer program product of claim 7, wherein the program instructions to determine one or more posts, of the identified one or more posts, that are within a predetermined threshold of similarity to the first post, based on a comparison between the identified one or more posts and the first post, further comprise program instructions to:
determine data structures for the identified one or more posts that compares an identified post to a data structure for the first post, based on identified keywords and metadata.

12. The computer program product of claim 7, wherein the at least one recommendation of an action to perform in the online social network is based on differences between the determined one or more posts and the first post.

13. A computer system for facilitating handling of a post to an online social network, the computer system comprising:
one or more computer processors;
one or more computer-readable storage media; and
program instructions stored on the computer-readable storage media for execution by at least one of the one or more processors, the program instructions comprising:
program instructions to receive a first post to an online social network from a first user;
program instructions to identify keywords associated with the first post;
program instructions to identify one or more posts similar to the first post based on at least the identified keywords, wherein the identified one or more posts were previously posted to the online social network, wherein the program instructions to identify one or more posts similar to the first post based on the identified keywords further comprise program instructions to utilizing, by one or more processors, Natural Language Processing (NLP) to analyze content, and associated metadata of posts that have been previously posted to the online social network;
program instructions to determine one or more posts, of the identified one or more posts, that are: (i) within a predetermined threshold of similarity to the first post, based on at least a comparison between the identified one or more posts and the first post, and (ii) are associated with a response received in the online social network; and
program instructions to determine at least one recommendation of an action to perform in the online social network based at least on actions associated with the determined posts that are within the predetermined threshold of similarity and are associated with the determined posts that have received a received response in the online social network, wherein the recommended action is a next action for the first user to perform, subsequent to posting the first post, in the online social network to solicit a response to the first post.

14. The computer system of claim 13, further comprising program instructions to:
provide the determined at least one recommendation of an action to the first user; and
responsive to receiving a selection of at least one of the determined at least one recommendation, perform at least one action associated with the received selection.

15. The computer system of claim 13, wherein a post to the online social network comprises at least one of: a plurality of posts associated with a conversation on the online social network, a plurality of posts associated with a subset of a conversation on the online social network, a sequence of posts on the online social network, a message posted to the online social network by a user of the online social network, a message posted to the online social network by a third-party application, and an experience that is embedded into the online social network by a third-party application.

16. The computer system of claim 13, wherein program instructions to identify keywords associated with the first post, further comprise program instructions to:
  utilize Natural Language Processing (NLP) to analyze content, and associated metadata of the first post,
  wherein the identified keywords comprise at least one of: content of the post, users associated with the post, metadata tags, topics associated with the post, and groups in the online social network associated with the post.

17. The computer system of claim 13, wherein the program instructions to determine one or more posts, of the identified one or more posts, that are within a predetermined threshold of similarity to the first post, based on a comparison between the identified one or more posts and the first post, further comprise program instructions to:
  determine data structures for the identified one or more posts that compares an identified post to a data structure for the first post, based on identified keywords and metadata.

* * * * *